(12) United States Patent
Chen et al.

(10) Patent No.: US 11,812,165 B2
(45) Date of Patent: Nov. 7, 2023

(54) METHOD AND APPARATUS FOR DYNAMICALLY CHANGING FRAME RATE OF SENSOR OUTPUT FRAMES ACCORDING TO WHETHER MOTION BLUR CONDITION IS MET

(71) Applicant: MEDIATEK INC., Hsin-Chu (TW)

(72) Inventors: Ying-Jui Chen, Hsinchu (TW);
Jing-Ying Chang, Hsinchu (TW);
Keh-Tsong Li, Hsinchu (TW);
Tai-Hsiang Huang, Hsinchu (TW);
I-Hsien Lee, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 21 days.

(21) Appl. No.: 17/491,548

(22) Filed: Oct. 1, 2021

(65) Prior Publication Data

US 2022/0408017 A1 Dec. 22, 2022

Related U.S. Application Data

(60) Provisional application No. 63/211,031, filed on Jun. 16, 2021.

(51) Int. Cl.
*H04N 23/951* (2023.01)
*H04N 23/65* (2023.01)
*H04N 23/667* (2023.01)

(52) U.S. Cl.
CPC ......... *H04N 23/951* (2023.01); *H04N 23/651* (2023.01); *H04N 23/667* (2023.01)

(58) Field of Classification Search
CPC ......... H04N 5/23232; H04N 5/232411; H04N 5/23245
See application file for complete search history.

(56) References Cited

U.S. PATENT DOCUMENTS

| 9,692,972 | B2 * | 6/2017 | Karpenko | H04N 23/6812 |
| 2002/0149693 | A1 * | 10/2002 | Tantalo | H04N 5/2351 |
| | | | | 348/E5.037 |
| 2009/0097773 | A1 * | 4/2009 | Nishi | G06T 5/003 |
| | | | | 382/264 |
| 2010/0231738 | A1 * | 9/2010 | Border | H04N 23/951 |
| | | | | 348/222.1 |
| 2011/0249750 | A1 * | 10/2011 | Fuchikami | H04N 19/513 |
| | | | | 375/E7.123 |

(Continued)

FOREIGN PATENT DOCUMENTS

| CN | 111917994 A | 11/2020 |
| CN | 112532883 A | 3/2021 |

*Primary Examiner* — Timothy J Henn
(74) *Attorney, Agent, or Firm* — Winston Hsu

(57) ABSTRACT

A video capture method includes: controlling an image sensor to capture a plurality of first sensor output frames at a first frame rate during a first period; during the first period, checking if a motion blur condition is met; in response to the motion blur condition being met during the first period, controlling the image sensor to capture a plurality of second sensor output frames at a second frame rate during a second period following the first period, wherein the second frame rate is higher than the first frame rate; and processing consecutive sensor output frames captured by the image sensor during the first period and the second period, to generate a plurality of output frames.

20 Claims, 4 Drawing Sheets

(56) References Cited

U.S. PATENT DOCUMENTS

| | | | | |
|---|---|---|---|---|
| 2014/0363044 A1* | 12/2014 | Williams | ............... | G06V 10/25 |
| | | | | 382/103 |
| 2015/0229889 A1* | 8/2015 | Boettiger | ................. | H04N 9/09 |
| | | | | 348/262 |
| 2016/0337666 A1* | 11/2016 | Shlyakhov | ........... | H04N 19/182 |
| 2020/0104969 A1* | 4/2020 | Aratani | ..................... | G06T 1/20 |
| 2020/0213497 A1* | 7/2020 | Kubo | ................... | H04N 23/682 |
| 2020/0382802 A1* | 12/2020 | Atkins | ................... | H04N 19/70 |

\* cited by examiner

METHOD AND APPARATUS FOR DYNAMICALLY CHANGING FRAME RATE OF SENSOR OUTPUT FRAMES ACCORDING TO WHETHER MOTION BLUR CONDITION IS MET

CROSS REFERENCE TO RELATED APPLICATIONS

This application claims the benefit of U.S. provisional application No. 63/211,031, filed on Jun. 16, 2021 and incorporated herein by reference.

BACKGROUND

The present invention relates to video recording, and more particularly, to a method and apparatus for dynamically changing a frame rate of sensor output frames according to whether a motion blur condition is met.

In video recording, camera motion and/or object motion may introduce the unwanted image blur. To address the motion blur issue, a conventional image deblur scheme may be employed to restore the clarity. However, the computation complexity of the conventional image deblur scheme is very high, and the conventional image deblur scheme may degrade the image quality due to the introduction of processing artifacts. One alternative solution for reducing the motion blur is to compromise the exposure time of the image sensor. Specifically, motion blur reduction can be achieved due to less motion captured under a shorter exposure time. However, there is a trade-off between image noise and motion blur. That is, when the image sensor is configured to use a longer exposure time, a captured frame has a lower image noise level but a higher motion blur level; and when the image sensor is configured to use a shorter exposure time, a captured frame has a higher image noise level but a lower motion blur level. The motion blur reduction can be achieved at the cost of higher image noise. Image noise level is roughly proportional to the amount of sensor exposure time. Avoiding motion blur by reducing the exposure time implies that the image sensor capability is not fully exploited.

Recently, some image sensors are equipped with a high frame rate feature. Having the image sensor working at high frame rate and short exposure time can achieve the motion blur reduction. Unfortunately, having the image sensor always working at the high frame rate results in high power consumption.

SUMMARY

One of the objectives of the claimed invention is to provide a method and apparatus for dynamically changing a frame rate of sensor output frames according to whether a motion blur condition is met.

According to a first aspect of the present invention, an exemplary video capture method is disclosed. The exemplary video capture method includes: controlling an image sensor to capture a plurality of first sensor output frames at a first frame rate during a first period; during the first period, checking if a motion blur condition is met; in response to the motion blur condition being met during the first period, controlling the image sensor to capture a plurality of second sensor output frames at a second frame rate during a second period following the first period, wherein the second frame rate is higher than the first frame rate; and processing consecutive sensor output frames captured by the image sensor during the first period and the second period, to generate a plurality of output frames.

According to a second aspect of the present invention, an exemplary video capture apparatus is disclosed. The exemplary video capture apparatus includes a frame rate control circuit, a motion analysis circuit, and a processing circuit. The frame rate control circuit is arranged to control an image sensor to capture a plurality of first sensor output frames at a first frame rate during a first period. During the first period, the motion analysis circuit is arranged to check if a motion blur condition is met. When the motion analysis circuit determines that the motion blur condition is met during the first period, the frame rate control circuit is further arranged to control the image sensor to capture a plurality of second sensor output frames at a second frame rate during a second period following the first period, where the second frame rate is higher than the first frame rate. The processing circuit is arranged to process consecutive sensor output frames captured by the image sensor during the first period and the second period, to generate a plurality of output frames.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
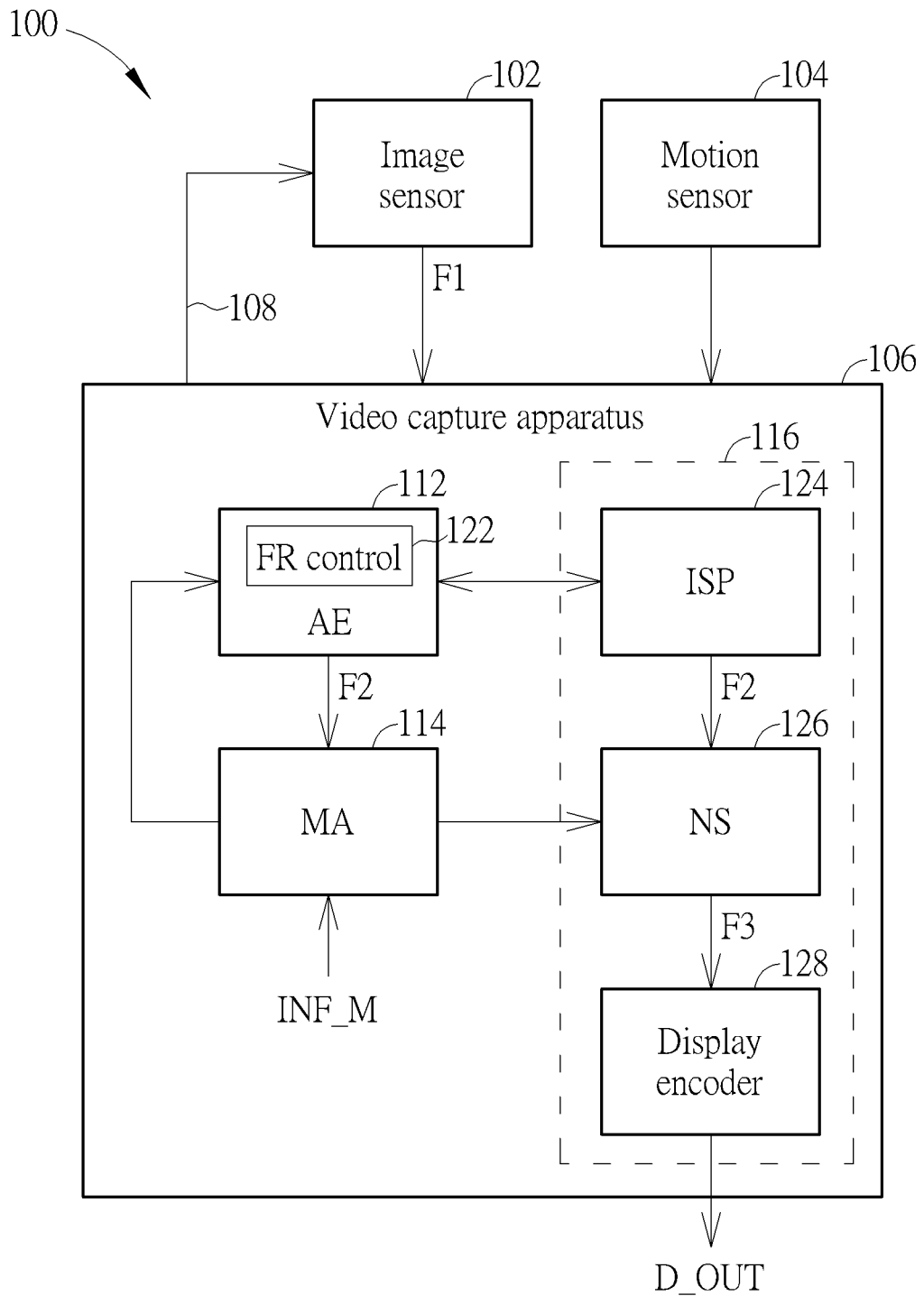
FIG. 1 is a camera system according to an embodiment of the present invention.

FIG. 1 is a camera system according to an embodiment of the present invention. The camera system 100 may be a part of a portable device, such as a cellular phone or a tablet. The camera system 100 may include an image sensor 102, a motion sensor 104, and a video capture apparatus 106. It should be noted that only the components pertinent to the present invention are illustrated in FIG. 1. In practice, the video capture apparatus 106 may include additional components for other designated functions. The image sensor 102 is arranged to capture a video sequence having a plurality of sensor output frames F1. For example, the image sensor 102 may be implemented by a complementary metal oxide semiconductor (CMOS) image sensor. In this embodiment, the image sensor 102 is equipped with high frame rate capability. The motion sensor 104 is arranged to provide motion information. For example, the motion sensor 104 may be implemented by a gyro sensor, and the motion information provided by the motion sensor 104 may be indicative of camera motion.

The video capture apparatus 106 has a plurality of circuits with designated functions, including an auto exposure circuit (labeled by "AE") 112, a motion analysis circuit (labeled by "MA") 114, and a processing circuit 106. In this embodiment, the auto exposure circuit 112 includes a frame rate control circuit (labeled by "FR control") 122 to enable a dynamic frame rate of the image sensor 102. The processing circuit 116 is arranged to receive the sensor output frames F1 from the image sensor 102, and process the received sensor output frames F1 to generate a recorded video stream D_OUT. In this embodiment, the processing circuit 106 includes an image signal processor (ISP) 124, a noise suppression circuit (labeled by "NS") 126, and a display encoder 128.

The auto exposure circuit 112 is arranged to determine an exposure setting according to the environment brightness, and then provide the exposure setting to the image sensor 102 via an inter-integrated circuit (I2C) bus 108. The motion analysis circuit 114 is arranged to obtain motion information INF_M for the noise suppression circuit 126, and is further arranged to determine if a motion blur condition is met. For example, the motion analysis circuit 114 may obtain motion information INF_M from image content analysis performed upon consecutive frames derived from sensor output frames F1 of the image sensor 102, where the motion information INF_M may be indicative of camera motion and/or object motion. For another example, the motion analysis circuit 114 may obtain motion information INF_M from the motion sensor 104, where the motion information INF_M may be indicative of camera motion. In addition, the motion analysis circuit 114 may obtain auto exposure (AE) stats INF_AE from the auto exposure circuit 112. After the motion information INF_M and the AE stats INF_AE are available, the motion analysis circuit 114 checks if the motion blur condition is met by referring to the motion information INF_M and the AE stats INF_AE. For example, the motion analysis circuit 114 refers to the AE stats INF_AE to learn the environment brightness and the exposure time, and determines if motion blur is concerned under an amount of motion estimated on the basis of the motion information INF_M.

The frame rate control circuit 122 is arranged to control a frame rate of the image sensor 102. Hence, a dynamic frame rate feature of the image sensor 102 can be achieved through the frame rate control circuit 122. For example, the frame rate control circuit 122 controls the image sensor 102 to capture sensor output frames F1 at a first frame rate when the motion blur condition is not met, and controls the image sensor 102 to capture other sensor output frames F1 at a second frame rate when the motion blur condition is met, where the second frame rate is higher than the first frame rate. That is, when motion blur is not concerned under the estimated amount of motion (i.e. motion blur condition is not met), the image sensor 102 may capture sensor output frames F1 at a low frame rate such as 30 frames per second (FPS); and when motion blur is concerned under the estimated amount of motion (i.e. motion blur condition is met), the image sensor 102 may capture other sensor output frames F1 at a high frame rate such as 90 FPS.

Furthermore, the auto exposure circuit 112 may control the image sensor 102 to capture sensor output frames F1 under a first exposure setting when the motion blur condition is not met, and may control the image sensor 102 to capture other sensor output frames F1 under a second exposure setting when the motion blur condition is met, where the exposure time specified by the second exposure setting is shorter than the exposure time specified by the first exposure setting. Hence, in some embodiments of the present invention, the image sensor 102 may capture sensor output frames F1 with high frame rate and short exposure time during one period, and may capture sensor output frames F1 with low frame rate and long exposure time during another period. Furthermore, the ratio of the second frame rate to the first frame rate is N:1 (N>1), and the ratio of the second exposure time to the first exposure time is 1:N (N>1). In this way, the image sensor capability is fully exploited for image quality enhancement.

The processing circuit 116 processes consecutive sensor output frames F1 captured by the image sensor 102 to generate a plurality of output frames F3, and encodes the output frames F3 into the recorded video stream D_OUT. The image signal processor 124 is arranged to process the consecutive sensor output frames F1 to generate a plurality of processed frames F2. The noise suppression circuit 126 may be configured to apply temporal noise reduction (TNR) to the processed frames F2 for generating the output frames F3. To relax the buffer requirement and the bandwidth requirement, the output frames F3 undergo an encoding process. Specifically, the display encoder 128 is arranged to encode the output frames F3 to generate the recorded video stream D_OUT that may be stored in a storage device or transmitted via a wireless/wired communication link.

As mentioned above, when motion blur is not concerned under the estimated amount of motion (i.e. motion blur condition is not met), the image sensor 102 is controlled to perform video frame capture under a lower frame rate and a longer exposure time; and when motion blur is concerned under the estimated amount of motion (i.e. motion blur condition is met), the image sensor 102 is controlled to perform video frame capture under a higher frame rate and a shorter exposure time. There is a trade-off between image noise and motion blur. When the image sensor is configured to use a shorter exposure time, a captured frame has a higher image noise level but a lower motion blur level. Hence, the motion blur issue can be addressed by reducing the exposure time. With regard to the image noise issue resulting from reducing the exposure time, additional frames that are obtained by the image sensor 102 operating under a higher frame rate can be used for noise suppression. For example, when motion blur is concerned under the estimated amount of motion (i.e. motion blur condition is met), the noise suppression circuit 126 may apply noise reduction (e.g. TNR) with frame rate conversion to input frames at the higher frame rate (e.g. 90 FPS) to generate output frames at an output frame rate having a fixed value (e.g. 30 FPS). Further details of the proposed video capture apparatus 106 are described as below, with reference to the accompanying drawings.

Figure 2:
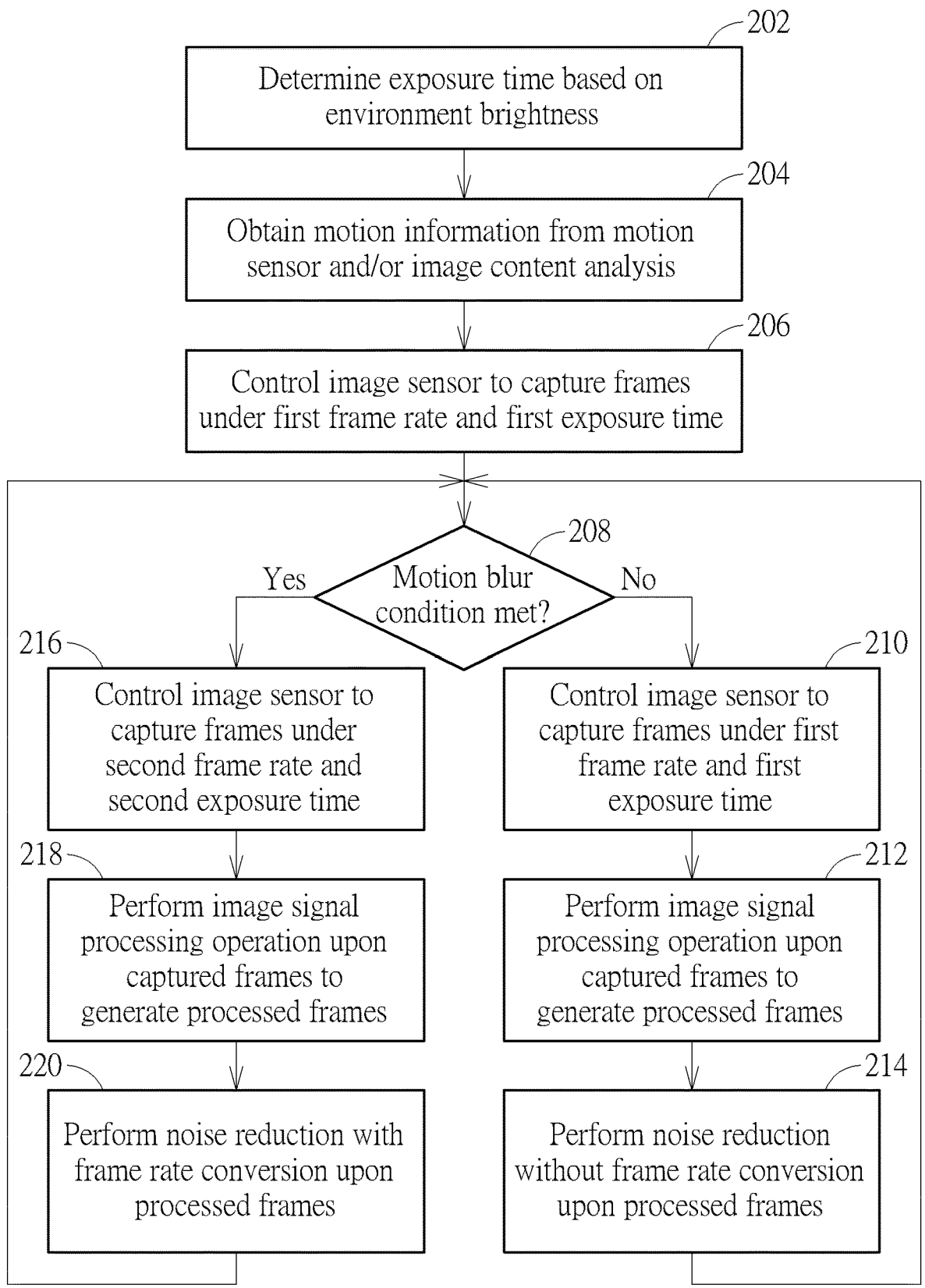
FIG. 2 is a flowchart illustrating a video capture method according to an embodiment of the present invention.
Figure 3:
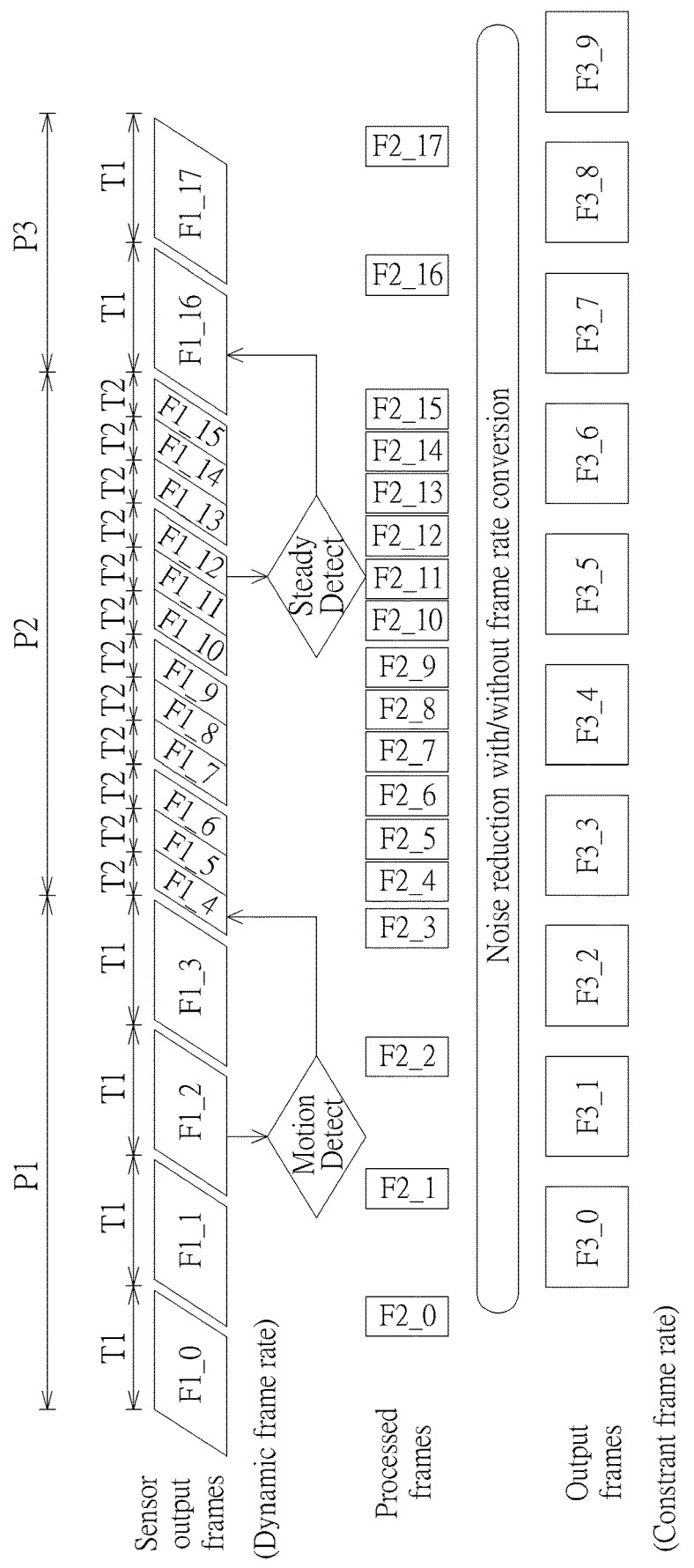
FIG. 3 is a diagram illustrating a video recording example using the proposed video capture method shown in FIG. 2.

Please refer to FIGS. 2 and 3 in conjunction with FIG. 1. FIG. 2 is a flowchart illustrating a video capture method according to an embodiment of the present invention. FIG. 3 is a diagram illustrating a video recording example using the proposed video capture method shown in FIG. 2. The video capture method shown in FIG. 2 may be employed by the video capture apparatus 106 shown in FIG. 1. Provided that the result is substantially the same, the steps are not required to be executed in the exact order shown in FIG. 2.

At step 202, the auto exposure circuit 112 determines an exposure setting for the image sensor 102 according to the environment brightness. For example, the auto exposure function may control the image sensor 102 to use a long exposure time for capturing a dim scene (i.e. a scene with low environment brightness), and may control the image sensor 102 to use a short exposure time for capturing a bright scene (i.e. a scene with high environment brightness).

At step 204, the motion analysis circuit 114 uses motion sensor 104 and/or image content to obtain motion information INF_M for TNR performed at the noise suppression circuit 126. In addition, the motion analysis circuit 114 may refer to the obtained motion information INF_M to estimate the amount of motion (e.g. camera motion and/or object motion).

At step 206, the image sensor 102 is instructed to capture sensor output frames F1 under a first frame rate and a first exposure time. For example, the first exposure time is set by the auto exposure circuit 112 at step 202, and the frame rate control circuit 122 sets the first frame rate by the output frame rate (e.g. 30 FPS) required by certain applications.

At step 208, the motion analysis circuit 114 checks if the motion blur condition is met. If the motion analysis circuit 114 determines that the motion blur condition is not met, the flow proceeds with step 210. At step 210, the image sensor 102 keeps capturing sensor output frames F1 under the first frame rate and the first exposure time. At step 212, the image signal processor 124 processes the sensor output frames F1 to generate processed frames F2. By way of example, but not limitation, the number of the processed frames F2 output from the image signal processor 124 is equal to the sensor output frames F1 received by the image signal processor 124. That is, no frame rate change occurs at the image signal processor 124. At step 214, the noise suppression circuit 126 applies noise reduction without frame rate conversion to the processed frames F2 for generating output frames F3 at a constant frame rate (e.g. 30 FPS).

As shown in FIG. 3, the frame rate control circuit 122 initially controls the image sensor 102 to capture sensor output frames F1_0-F1_3 at the first frame rate during one period P1, where each of the sensor output frames F1_0-F1_3 is captured under the first exposure time T1 decided by the auto exposure circuit 112. Hence, the image signal processor 124 processes the sensor output frames F1_0-F1_3 to generate the processed frames F2_0-F2_3, respectively. Specifically, the processed frame F2_0 is derived from performing an image signal processing operation upon the sensor output frame F1_0, the processed frame F2_1 is derived from performing an image signal processing operation upon the sensor output frame F1_1, the processed frame F2_2 is derived from performing an image signal processing operation upon the sensor output frame F1_2, and the processed frame F2_3 is derived from performing an image signal processing operation upon the sensor output frame F1_3. Functions included in the image signal processing operation depend on actual design considerations. Since the present invention does not focus on the image signal processer design, further description is omitted here for brevity. The noise suppression circuit 126 applies noise reduction without frame rate conversion upon the processed frames F2_0-F2_3 to generate output frames F3_0-F3_3 at a constant frame rate (e.g. 30 FPS). The first frame rate employed by the image sensor 102 may be set by the constant frame rate of output frames F3.

If the motion analysis circuit 114 determines that the motion blur condition is met due to large motion (step 208), the flow proceeds with step 216. At step 216, the image sensor 102 is instructed to capture sensor output frames F1 under a second frame rate and a second exposure time, where the second frame rate (e.g. 90 FPS) is higher than the first frame rate (e.g. 30 FPS), and the second exposure time is shorter than the first exposure time. At step 218, the image signal processor 124 processes the sensor output frames F1 to generate processed frames F2. By way of example, but not limitation, the number of the processed frames F2 output from the image signal processor 124 is equal to the sensor output frames F1 received by the image signal processor 124. That is, no frame rate change occurs at the image signal processor 124. At step 220, the noise suppression circuit 126 applies noise reduction with frame rate conversion to the processed frames F2 for generating output frames F3 at the constant frame rate (e.g. 30 FPS).

As shown in FIG. 3, the motion analysis circuit 114 detects that the motion blur condition is met when the sensor output frame F1_2 is captured by the image sensor 102 and the motion sensor 102 starts capturing the sensor output frame F1_3. In response to the motion blur condition being met, the frame rate control circuit 122 controls the image sensor 102 to capture sensor output frames F1_4-F1_15 at the second frame rate during the next period P2 immediately following the period P1, where each of the sensor output frames F1_4-F1_15 is captured under the second exposure time T2 set by the auto exposure circuit 112 for motion blur reduction. In this embodiment, the first exposure time T1 is equally divided into three second exposure times T2, and consecutive sensor output frames, each having one of the second exposure times T2, are captured within a period equal to the first exposure time T1. Hence, the image sensor capability is fully exploited when the exposure time is reduced for motion blur reduction. Specifically, consecutive sensor output frames F1_4-F1_6 are captured during one period equal to the first exposure time T1, consecutive sensor output frames F1_7-F1_9 are captured during one period equal to the first exposure time T1, consecutive sensor output frames F1_10-F1_12 are captured during one period equal to the first exposure time T1, and consecutive sensor output frames F1_13-F1_15 are captured during one period equal to the first exposure time T1.

The image signal processor 124 processes the sensor output frames F1_4-F1_15 to generate the processed frames F2_4-F2_15, respectively. Specifically, the processed frame F2_4 is derived from performing an image signal processing operation upon the sensor output frame F1_4, the processed frame F2_5 is derived from performing an image signal processing operation upon the sensor output frame F1_5, and so on. The noise suppression circuit 126 applies noise reduction with frame rate conversion upon the processed frames F2_4-F2_15 to generate output frames F3_4-F3_7 at the constant frame rate (e.g. 30 FPS).

Figure 4:
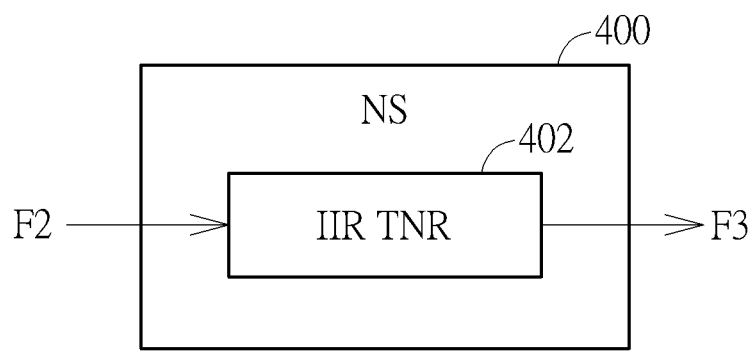
FIG. 4 is a diagram illustrating a first noise suppression circuit according to an embodiment of the present invention.

It should be noted that any means capable of achieving noise reduction with frame rate conversion may be employed by the noise suppression circuit 126. FIG. 4 is a diagram illustrating a first noise suppression circuit according to an embodiment of the present invention. The noise suppression circuit 126 shown in FIG. 1 may be implemented by the noise suppression circuit 400. As shown in FIG. 4, the noise suppression circuit 400 includes an infinite impulse response (IIR) type TNR filter (labeled by "IIR TNR") 402. The IIR type TNR filter 402 is arranged to work at 1:1 ratio (1 frame in, 1 frame out) in a normal mode, and is arranged to work at a higher frame rate to use collected frame data to suppress noise. Once noise is suppressed by the received additional frames, it can down-sample each frame by N:1 ratio, where N is an increased frame rate ratio from the frame rate control.

Figure 5:
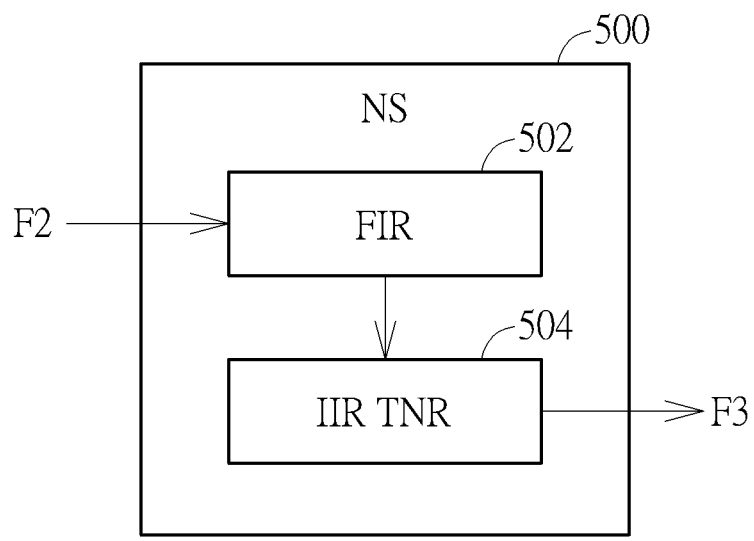
FIG. 5 is a diagram illustrating a second noise suppression circuit according to an embodiment of the present invention.

FIG. 5 is a diagram illustrating a second noise suppression circuit according to an embodiment of the present invention. The noise suppression circuit 126 shown in FIG. 1 may be implemented by the noise suppression circuit 500. As shown in FIG. 5, the noise suppression circuit 500 includes a finite impulse response (FIR) filter (labeled by "FIR") 502 and an infinite impulse response (IIR) type TNR filter (labeled by "IIR TNR") 504. The FIR filter 502 may be an N-tap FIR filter, and the IIR type TNR filter 504 may be a 1:1 IIR TNR filter, where N is an increased frame rate ratio from the frame rate control. Hence, N-to-1 noise suppression and frame rate conversion is performed at the FIR filter 502, and then an output of the FIR filter 502 is further processed by the IIR type TNR filter 504 without frame rate conversion.

After the image sensor 102 is instructed to operate under the second frame rate that is higher than the first frame rate, the motion analysis circuit 114 keeps monitoring the motion blur condition (Step 208) for determining whether to instruct the image sensor 102 to leave a high sensor frame rate mode and enter a normal sensor frame rate mode. If the motion analysis circuit 114 determines that the motion blur condition is not met due to steady-state video capture, the flow proceeds with step 210 for changing the frame rate as well as the exposure time. At step 210, the image sensor 102 is instructed to capture sensor output frames F1 under the first frame rate and the first exposure time. At step 212, the image signal processor 124 processes the sensor output frames F1 to generate processed frames F2. At step 214, the noise suppression circuit 126 applies noise reduction without frame rate conversion to the processed frames F2 for generating output frames F3 at the constant frame rate (e.g. 30 FPS).

As shown in FIG. 3, the motion analysis circuit 114 detects that the motion blur condition is not met when the sensor output frame F1_12 is captured by the image sensor 102 and the image sensor 102 starts capturing the sensor output frame F1_13. In response to the motion blur condition being not met, the frame rate control circuit 122 controls the image sensor 102 to capture sensor output frames F1_16 and F1_17 at the first frame rate during the next period P3 immediately following the period P2, where each of the sensor output frames F1_16 and F1_17 is captured under the first exposure time T1 decided by the auto exposure circuit 112. The image signal processor 124 processes the sensor output frames F1_16 and F1_17 to generate the processed frames F2_16 and F2_17, respectively. Specifically, the processed frame F2_16 is derived from performing an image signal processing operation upon the sensor output frame F1_16, and the processed frame F2_17 is derived from performing an image signal processing operation upon the sensor output frame F1_17. The noise suppression circuit 126 applies noise reduction without frame rate conversion upon the processed frames F2_16 and F2_17 to generate output frames F3_8 and F3_9 at the constant frame rate (e.g. 30 FPS). It should be noted that, the frame rate of the output frames F3_0-F3_9 shown in FIG. 3 is fixed, regardless of the frame rate of the image sensor 102.

In summary, the video capture apparatus 106 and associated video capture method can break the trade-off between image noise and motion blur by jointly using a dynamic sensor frame rate control scheme and a noise reduction scheme. In addition, the video capture apparatus 106 and associated video capture method adopt a motion blur detection scheme, such that the image sensor 102 and the image signal processor 124 only process high frame rate data when the motion blur condition is met. In this way, the image quality can be enhanced without significantly increasing the power consumption. When motion blur is not concerned under estimated amount of motion (i.e. motion blur condition is not met), the image sensor 102 generates sensor output frames under long exposure time. In this way, low-noise output frame with low motion blur is provided under a situation where the estimated amount of motion does not exceed a predefined threshold. When motion blur is concerned under estimated amount of motion (i.e. motion blur condition is met), the image sensor 102 generates sensor output frames under short exposure time, thereby achieving motion blur reduction. Additional frames obtained due to an increased frame rate can be used by the noise suppression circuit 126 for noise suppression. In this way, low-noise frame with low motion blur is provided under a situation where the estimated amount of motion exceeds the pre-defined threshold. Furthermore, to stabilize the frame rate of the recorded video stream, a noise reduction scheme with frame rate conversion is employed by the noise suppression circuit 126.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video capture method comprising:

controlling an image sensor to capture a plurality of first sensor output frames at a first frame rate during a first period;

during the first period, checking if a motion blur condition is met, wherein the motion blur condition is met when an estimated amount of motion exceeds a pre-defined threshold;

in response to the motion blur condition being met during the first period, controlling the image sensor to capture a plurality of second sensor output frames at a second frame rate during a second period following the first period, wherein the second frame rate is higher than the first frame rate; and processing consecutive sensor output frames captured by the image sensor during the first period and the second period, to generate a plurality of output frames, comprising:

in response to the motion blur condition being not met, performing noise suppression without frame rate conversion upon a plurality of first input frames at the first frame rate, to generate and output a plurality of first output frames at the first frame rate, wherein the plurality of first input frames are derived from the plurality of first sensor output frames captured at the first frame rate, and the plurality of first output frames are included in the plurality of output frames; and in response to the motion blur condition being met, performing noise suppression with frame rate conversion upon a plurality of second input frames at the second frame rate, to generate and output a plurality of second output frames at the first frame rate, wherein the plurality of second input frames are derived from the plurality of second sensor output frames captured at the second frame rate, and the plurality of second output frames are included in the plurality of output frames.

2. The video capture method of claim 1, wherein each of the plurality of first sensor output frames is captured under a first exposure time, and each of the plurality of second sensor output frames is captured under a second exposure time shorter than the first exposure time.

3. The video capture method of claim 2, wherein the first exposure time is divided into a plurality of second exposure times; and consecutive second sensor output frames, each having one of the plurality of second exposure times, are captured within a period equal to the first exposure time.

4. The video capture method of claim 1, further comprising:
during the second period, checking if the motion blur condition is not met; and
in response to the motion blur condition being not met during the second period, controlling the image sensor to capture a plurality of third sensor output frames at the first frame rate during a third period following the second period.

5. The video capture method of claim 1, wherein during the first period and the second period, the plurality of output frames are generated at a constant frame rate that is equal to the first frame rate.

6. The video capture method of claim 5, wherein the consecutive sensor output frames comprise the plurality of first sensor output frames and the plurality of second sensor output frames, and processing the consecutive sensor output frames captured during the first period and the second period, to generate the plurality of output frames further comprises:
performing an image signal processing operation upon the plurality of second sensor output frames at the second frame rate to generate a plurality of processed frames as the plurality of second input frames.

7. The video capture method of claim 6, wherein the noise suppression with frame rate conversion operation comprises infinite impulse response (IIR) type temporal noise reduction (TNR).

8. The video capture method of claim 6, wherein the noise suppression with frame rate conversion operation comprises finite impulse response (FIR) filtering followed by infinite impulse response (IIR) type temporal noise reduction (TNR).

9. The video capture method of claim 1, wherein checking if the motion blur condition is met comprises:
obtaining motion information from image content analysis;
obtaining auto exposure (AE) stats; and
checking if the motion blur condition is met by referring to the motion information and the AE stats.

10. The video capture method of claim 1, wherein checking if the motion blur condition is met comprises:
obtaining motion information from a motion sensor;
obtaining auto exposure (AE) stats; and
checking if the motion blur condition is met by referring to the motion information and the AE stats.

11. A video capture apparatus comprising:
a frame rate control circuit, arranged to control an image sensor to capture a plurality of first sensor output frames at a first frame rate during a first period;
a motion analysis circuit, wherein during the first period, the motion analysis circuit is arranged to check if a motion blur condition is met, wherein the motion blur condition is met when an estimated amount of motion exceeds a pre-defined threshold; when the motion analysis circuit determines that the motion blur condition is met during the first period, the frame rate control circuit is further arranged to control the image sensor to capture a plurality of second sensor output frames at a second frame rate during a second period following the first period, where the second frame rate is higher than the first frame rate; and
a processing circuit, arranged to process consecutive sensor output frames captured by the image sensor during the first period and the second period, to generate a plurality of output frames, wherein the processing circuit comprises:
a noise suppression circuit, wherein when the motion analysis circuit determines that the motion blur condition is not met, the noise suppression circuit is arranged to perform noise suppression without frame rate conversion upon a plurality of first input frames at the first frame rate, to generate and output a plurality of first output frames at the first frame rate, where the plurality of first input frames are derived from the plurality of first sensor output frames captured at the first frame rate, and the plurality of first output frames are included in the plurality of output frames; and when the motion analysis circuit determines that the motion blur condition is met, the noise suppression circuit is arranged to perform noise suppression with frame rate conversion upon a plurality of second input frames at the second frame rate, to generate and output a plurality of second output frames at the first frame rate, where the plurality of second input frames are derived from the plurality of second sensor output frames captured at the second frame rate, and the plurality of second output frames are included in the plurality of output frames.

12. The video capture apparatus of claim 11, wherein each of the plurality of first sensor output frames is captured under a first exposure time, and each of the plurality of second sensor output frames is captured under a second exposure time shorter than the first exposure time.

13. The video capture apparatus of claim 12, wherein the first exposure time is divided into a plurality of second exposure times; and consecutive second sensor output frames, each having one of the plurality of second exposure times, are captured within a period equal to the first exposure time.

14. The video capture apparatus of claim 11, wherein during the second period, the motion analysis circuit is further arranged to check if the motion blur condition is not met; and when the motion analysis circuit determines that the motion blur condition is not met during the second period, the frame rate control circuit is further arranged to control the image sensor to capture a plurality of third sensor output frames at the first frame rate during a third period following the second period.

15. The video capture apparatus of claim 11, wherein during the first period and the second period, the plurality of output frames are generated at a constant frame rate that is equal to the first frame rate.

16. The video capture apparatus of claim 15, wherein the consecutive sensor output frames comprise the plurality of first sensor output frames and the plurality of second sensor output frames, and the processing circuit further comprises:
an image signal processor (ISP), arranged to process the plurality of second sensor output frames at the second frame rate to generate a plurality of processed frames as the plurality of second input frames.

17. The video capture apparatus of claim 16, wherein the noise suppression circuit comprises an infinite impulse response (IIR) type temporal noise reduction (TNR) filter.

18. The video capture apparatus of claim 16, wherein the noise suppression circuit comprises:
- a finite impulse response (FIR) filter; and
- an infinite impulse response (IIR) type temporal noise reduction (TNR) filter, arranged to process an output of the FIR filter.

19. The video capture apparatus of claim 11, wherein the motion analysis circuit is arranged to:
- obtain motion information from image content analysis;
- obtain auto exposure (AE) stats; and
- check if the motion blur condition is met by referring to the motion information and the AE stats.

20. The video capture apparatus of claim 11, wherein the motion analysis circuit is arranged to:
- obtain motion information from a motion sensor;
- obtain auto exposure (AE) stats; and
- check if the motion blur condition is met by referring to the motion information and the AE stats.

* * * * *